May 3, 1966  R. G. HOPKINSON  3,249,332
VALVE SEAT STRUCTURE FOR FIRE HYDRANTS
Filed Dec. 21, 1962

INVENTOR
Ronald G. Hopkinson
BY Harold G. Wein
PATENT AGENT

3,249,332
VALVE SEAT STRUCTURE FOR FIRE HYDRANTS

Ronald G. Hopkinson, Vanderbelj Park, Transvaal, Republic of South Africa, assignor to Thomas Lawson & Sons Limited, Ottawa, Ontario, Canada
Filed Dec. 21, 1962, Ser. No. 246,385
3 Claims. (Cl. 251—148)

This invention relates to fire hydrants and valve structures therefor.

Conventional fire hydrants require a valve mechanism having a main valve opening which is at least one and one-half inches smaller than the internal diameter of the standpipe. For example, a valve mechanism having a 4¼ inch opening requires a 6 inch standpipe; one having a 5¼ inch opening requires a 7 inch standpipe; and one having a 6¼ inch opening requires an 8 inch standpipe. Obviously, if a hydrant structure having a standpipe of smaller internal diameter could be employed with a valve mechanism of specified valve opening, very substantial savings in cost of manufacture would result. This is especially so in respect of the commonly required five inch (or thereabouts) valve opening which presently requires a seven inch standpipe. Six inch pipes, and fittings, couplings and the like usable therewith, are of standard manufacture and general commercial availability with resultant low relative cost. On the other hand, seven inch pipes and their fittings are not of standard manufacture. Thus, not only is there added material expense but the cost of manufacture is relatively much higher.

However, while many workers in the field have striven to produce a fire hydrant having not substantially more than a one inch spread between the valve opening and the internal diameter of the standpipe, no such article appears to have heretofore become available.

It is a general object of this invention to provide a fire hydrant of reduced cost of manufacture without impairment of its structural life or operating efficiency.

A more specific object is to provide a fire hydrant having a standpipe of reduced size without reduction of its operating efficiency.

One reason for the existing size of conventional hydrants is the provision of a radially extending shoulder on the valve structure for seating on a complementary shoulder usually provided on the foot of the hydrant. The present invention contemplates substantial elimination of this valve shoulder which consequently reduces the radial extent of the valve. It has been previously considered that such a shoulder was necessary for adequate support but the structure of the present invention is such as to avoid the need of this support.

Figure 1:
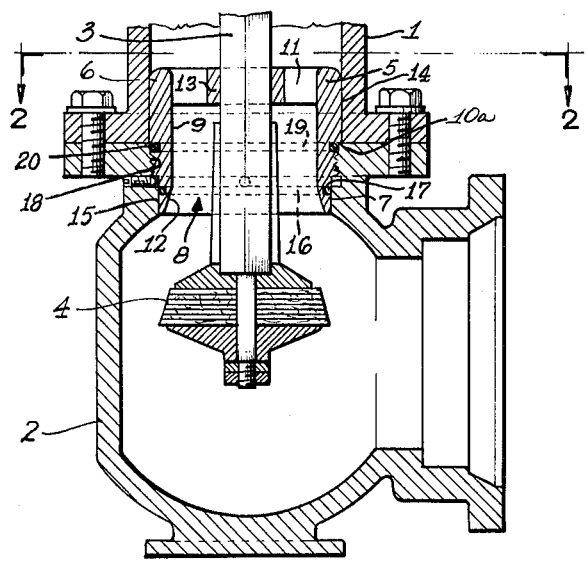
Figure 2:
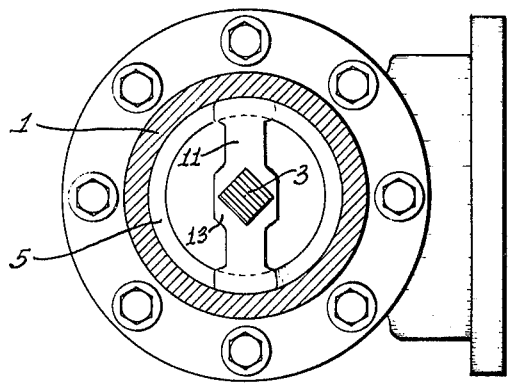

The invention will be described with reference to the acompanying drawing, in which:

FIGURE 1 is a sectional side elevation of a fire hydrant in accordance with the invention, and FIGURE 2 is a section on line 2—2 of FIGURE 1.

Referring to the drawing, 1 is the standpipe or barrel, 2 the foot, 3 the valve operating rod, and 4 the valve plug in the foot carried by the rod 3.

A cylindrical valve seat member 5, preferably of bronze, is mounted in the foot. The seat member 5 is of annular form and has an upper portion 6 and a lower portion 7. The seat member has a valve opening 8 defined by a substantially uninterrupted internal surface 9 of uniform diameter extending from the upper end of the member to a valve seat surface 12 at the lower end of the member. The valve seat surface 12 is of gradually increasing diameter from the lower end of the member to its juncture with surface 9. A diametral bridge 11 at the upper end of the member provides a bearing 13 through which the rod 3 extends.

The upper portion of seat member 5 has an external surface 14 of uninterrupted form and uniform diameter for engagement with the internal surface of the standpipe 1. The portion of the seat member 5 having the external surface 14 thereon is of such radial thickness and extends upwardly into the standpipe 1 a sufficient distance to lend rigidity to the joint formed between the standpipe 1 and foot 2. The lower portion of seat member 5 has an external surface 15 for engagement with foot 2. The surface 15 is also of uninterrupted form and uniform diameter except for the provision of an annular groove 16 therein. Seated in groove 16 is an O-ring 17 in sealing engagement with the foot. The surface 15 is of slightly smaller diameter than that of surface 9.

Intermediate surfaces 9 and 15 is an external threaded section 18 in threaded engagement with the foot. The maximum diameter of section 18 is but slightly less than that of surface 9 to provide a thread stop 10a. The thread stop 10a need not exceed, say, ⅟₁₆ inch in radial extent.

It will be observed that the valve seat member has been constructed to reduce its radial extent to a minimum. To this end, the angle of the bevelled surface 12 has a critical bearing. This angle should not be substantially less than 10° in order to provide sufficient radial bearing surface for the valve plug. On the other hand, it should not be more than 30° in order to conserve radial extent of the seat member. An angle of approximately 15° is satisfactory. Use of the O-ring 14 instead of a conventional gasket also contributes substantially to the reduction in radial extent of the seat member. For instance, a saving of approximately ¼ inch is effected by such use. Moreover, the use of other gaskets and bushings has been avoided. As a result, it is possible to reduce the radial extent of the valve structure and the diameter of the standpipe employed therewith to the desired extent.

By way of example, the valve seat described may have a maximum external diameter of approximately 5⅞″ and a valve opening of 5 inch diameter. The standpipe 1 may be of standard 6 inch diameter.

The following additional dimensions of the valve seat member described are given by way of example:

Angle of taper of valve seat surface 12 _____ 15°
Internal diameter of valve seat end (after taper) ___ 5.4″
External diameter of valve seat end _____ 5.6″
Axial extent of surface 12 _____ ¾″

An annular groove 19 may, if desired, be provided in the external surface of the seat member between the threaded section 18 and surface 9. An O-ring 20 in sealing engagement with the foot may be seated in groove 19.

I claim:
1. A fire hydrant comprising a standpipe, a foot fixed to one end of said standpipe and forming a joint therebetween, and a cylindrical valve seat member having a lower end, an upper end, an annular internal valve seat surface extending from said lower end, said valve seat surface being of gradually decreasing diameter from said lower end and being at an angle of 10° to 30° to the vertical, an internal cylindrical surface substantially uniform in diameter extending from said valve seat surface to said upper end, an external cylindrical surface of substantially uniform diameter in engagement with the internal surface of said standpipe and extending from said upper end to said one end of said standpipe, the portion of said valve seat member having said external cylindrical surface being of such radial thickness and extending into said standpipe sufficiently as to lend rigidity to said joint, said diameter of said external cylindrical surface constituting the maximum external diameter of said valve seat member, an externally threaded section between said external cylindrical surface and said lower end in threaded engagement with said foot, a second external cylindrical surface extending from said threaded section to said lower end having a maximum diameter less than said maximum diameter of said externally threaded section, an annular groove in said second external cylindrical surface, said second external cylindrical surface being otherwise of substantially uniform diameter from end to end thereof and in engagement with said foot, an O-ring seated in said groove and in sealing engagement with said foot, said internal cylindrical surface constituting a valve opening, said valve seat member having a second annular groove in the external surface thereof disposed between said first external cylindrical surface and said threaded section, and an O-ring seated in said second groove and in sealing engagement with said foot.

2. A fire hydrant as defined in claim 1, the diameter of said valve opening being not substantially more than one inch less than the internal diameter of said standpipe.

3. A fire hydrant as defined in claim 1, said angle being approximately 15 degrees.

References Cited by the Examiner
UNITED STATES PATENTS

| | | | |
|---|---|---|---|
| 601,378 | 3/1898 | Kaiser | 137—283 |
| 1,083,291 | 1/1914 | Miller | 137—304 |
| 2,088,426 | 7/1937 | Lofton | 137—289 |
| 3,076,474 | 2/1963 | Skomp | 137—307 |
| 3,104,554 | 9/1963 | Mueller | 137—307 X |

ISADOR WEIL, *Primary Examiner.*

R. GERARD, *Assistant Examiner.*